United States Patent

Huszarik et al.

(10) Patent No.: US 6,446,993 B1
(45) Date of Patent: Sep. 10, 2002

(54) CONTROL ARM BUSHING

(75) Inventors: Ronald J. Huszarik, Rochester Hills, MI (US); Terry R Costyk, New Castle, IN (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/691,521

(22) Filed: Oct. 18, 2000

(51) Int. Cl.$^7$ ............................................. B60G 11/22
(52) U.S. Cl. ......................... 280/124.177; 280/124.1; 267/57.1
(58) Field of Search ................... 280/124.177, 124.1, 280/689, 723; 267/57.1

(56) References Cited

U.S. PATENT DOCUMENTS

| | | |
|---|---|---|
| 2,079,798 A | 5/1937 | Geyer |
| 2,621,876 A | 12/1952 | Else |
| 4,723,791 A * | 2/1988 | Miura et al. ................. 280/716 |
| 4,899,997 A | 2/1990 | Thorn |
| 5,538,274 A * | 7/1996 | Schmitz et al. ............. 280/666 |
| 5,613,668 A | 3/1997 | Brunerye |
| 5,816,587 A * | 10/1998 | Stewart et al. ............ 280/5.516 |
| 5,865,429 A | 2/1999 | Gautheron |
| 5,884,892 A | 3/1999 | Gassen et al. |
| 5,974,856 A * | 11/1999 | Elie et al. ................... 73/11.04 |
| 5,996,981 A * | 12/1999 | Dilling ........................ 267/153 |

FOREIGN PATENT DOCUMENTS

| | | | |
|---|---|---|---|
| DE | 1455607 | 6/1969 | |
| DE | 3703868 A1 * | 8/1988 | ........... B62D/17/00 |
| JP | 405280567 A | 10/1993 | |

* cited by examiner

Primary Examiner—Kenneth R. Rice
Assistant Examiner—Christopher Buchanan
(74) Attorney, Agent, or Firm—Ralph E. Smith

(57) ABSTRACT

An automotive suspension system bushing is provided, including an inner sleeve, an outer sleeve having an upwardly generally perpendicular extending flange, and a non-fluid filled elastomeric isolator bonded to the inner and outer sleeves, the isolator having transversely aligned solid sections and first and second generally arcuate axial slots geometrically spaced with respect to one another, the first slot having a major arcuate portion with a generally uniform axial first thickness and the second slot having a major arcuate portion with a non-uniform axial second thickness, the second slot on an axial upper end having a thickness more than one millimeter and less than the first slot thickness and the second slot thickness being tapered axially downward wherein at least one-third of the axial length of the second slot along the lower end has contact between the fore and aft walls of the second slot.

11 Claims, 3 Drawing Sheets

CONTROL ARM BUSHING

FIELD OF THE INVENTION

The field of the present invention is an automotive vehicle front suspension lower control arm rear bushing. More particularly, the present invention relates to an apparatus and method of utilization of a front suspension lower control arm rear bushing which substantially diminishes rotating mass imbalance sensitivity without significantly increasing vehicle ride harshness.

BACKGROUND OF THE INVENTION

Some front wheel drive vehicles, especially smaller vehicles, are extremely sensitive to rotating mass imbalance. In some instances, a small 3.5 inch-ounce of imbalance can cause the steering wheel of a very small vehicle to oscillate. Empirical evidence has shown that the mechanism of steering wheel oscillation starts with a rotating mass imbalance of the wheel, tire, rotor and hub imparting a force to the front wheel spindle. The force on the spindle can sometimes be large enough to excite the natural frequency of what is typically referred to as the unsprung mass (wheel, tire, rotor, brake caliper, knuckle, lower control arm, etc.). This so-called unsprung mass is in actuality sprung on four springs. The four springs are the tire sidewall, a strut mount bushing, and the lower control arm front and rear bushings.

As the unsprung mass begins to resonate, it mechanically drives the steering gear back and forth, which causes the steering wheel to oscillate. In some small vehicles the peak steering wheel oscillation can occur in the vicinity of 17 hz. A 17 hz oscillation typically corresponds with a vehicle speed of 72 mph.

Typically, to reduce steering wheel oscillation, it is desirable to move the natural frequency of the unsprung mass beyond the normal operating range of the vehicle. Accordingly, it is desirable to move the natural frequency of the suspension system above 120 mph, which is typically above or at least in the far extreme range of operation of most commercial vehicles in North America. At a speed of 120 mph, it is typical that the natural frequency will move above 30 hz.

Various factors typically control the natural frequency of the suspension system. One factor is the area moment of inertia, which is controlled by the shape and location of the suspension system brake and power train components. If these parameters are defined by other performance characteristics, little change in these parameters is available to reduce the susceptibility of the suspension system to rotating mass imbalance. Another factor that controls the natural frequency is the lever arm that the force acts upon, or as better defined, the distance of the force to the instant center of the unsprung mass. Again, in many instances, these parameters will be predefined by other operational parameters of the vehicle.

One technique to modify the natural frequency of the suspension system would be a drastic reduction in the mass of the suspension system. In most instances, this is not a viable option due to strength requirements of the suspension system.

Another technique to modify the natural frequency of the suspension system is to change the elastic modulus of the softest spring in the system. In a suspension system, the softest spring in the system controls the resultant value of the elastic modulus of the system. In a front suspension system, the lower control arm rear bushing defines the softest spring.

Prior to the present invention, attempts were made to provide a higher natural frequency for the suspension system by stiffening the lower control arm rear bushing. However, substantial increases in bushing stiffness typically resulted in a vehicle having an unacceptable harsh ride.

Still another technique to eliminate vibrations in front suspension systems was to dampen the vibrations by utilizing a mass damper or a fluid damper such as a hydro bushing. The utilization of dampers and hydro bushings not only added complexity to the suspension system but also significantly increased costs, which is a critical factor when the front suspension is utilized on a small economy vehicle.

It is desirable to provide a low cost method to reduce vehicle sensitivity to rotating mass imbalance in the front suspension of automotive front wheel drive vehicles.

SUMMARY OF THE INVENTION

To make manifest the above-delineated and other manifold desires, the revelation of the present invention is brought forth. In a preferred embodiment, the present invention provides a bushing for a suspension system of an automotive vehicle. The bushing has an inner sleeve made of a hardened material. Annularly spaced from the inner sleeve is an outer sleeve also made from a hardened material. The outer sleeve has an upwardly generally perpendicular extending flange. Juxtaposed between the inner and outer sleeves is a non-fluid filled elastomeric isolator. The isolator is bonded to both sleeves. The isolator has transversely aligned solid sections. The isolator also has first and second generally arcuate axial slots geometrically spaced with one another. The first slot has a major arcuate portion with a generally uniform axial first thickness. The second slot has a major arcuate portion with a non-uniform axial second thickness. The second slot on an axial upper end has a thickness more than 1 millimeter and less than the thickness of the first slot. The second slot thickness will taper axially down to a lower one-third portion wherein the fore and aft walls of the slot will be in contact with each other. The bushing of the present invention is less prone to a natural frequency resonance and has a significantly higher natural frequency from that of prior bushings having generally identical slots. Accordingly, the natural frequency of the bushing is increased and the sensitivity of the suspension system to rotating mass imbalance is greatly diminished.

It is a feature of the present invention to provide a lower control arm rear bushing for a front wheel drive automotive vehicle suspension.

It is a feature of the present invention to provide an automotive vehicle with a front suspension that is less susceptible to vibration caused by rotating mass imbalance.

Other features of the invention will become more apparent to those skilled in the art upon a reading of the following detailed description and upon reference to the drawings.

DETAILED DESCRIPTION OF THE INVENTION

Figure 1:
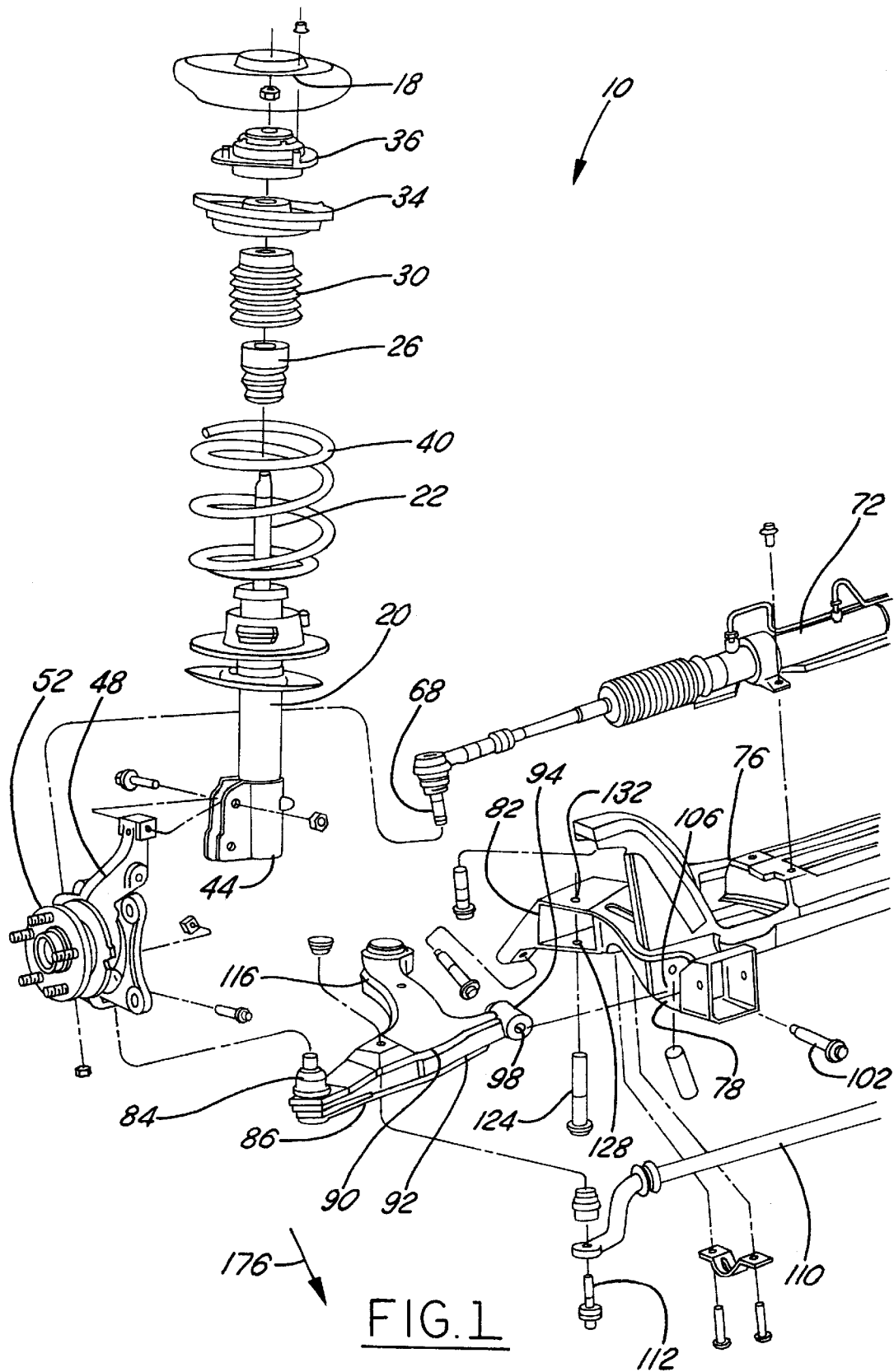
FIG. 1 is an exploded view of a front suspension on a front wheel drive automotive vehicle that utilizes a McPherson strut.
Figure 2:
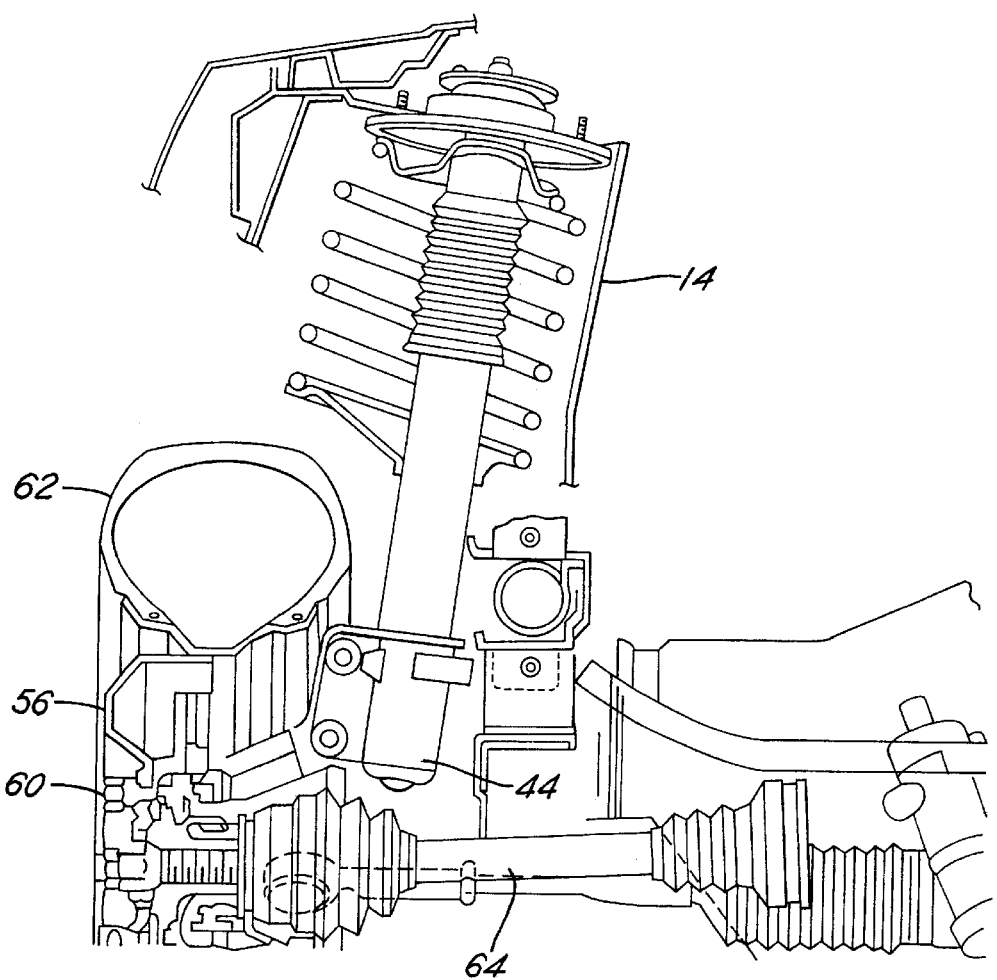
FIG. 2 is a view of the front wheel drive suspension shown in FIG. 1 in its assembled form.

Referring to FIGS. 1 through 5, an automotive vehicle front wheel drive front suspension 10 includes a shock tower 14. The shock tower 14 is formed of sheet metal that is rigidly connected with the frame of the vehicle. Mounted to the shock tower 14 is a strut tower cap 18. The tower cap 18 is connected with a McPherson strut 20. The McPherson strut 20 has a shaft 22 which extends through a jounce bumper 26, a dust shield 30, a spring bridge assembly 34 and a mounting assembly 36. The McPherson strut shaft 22 is also encircled by a spring 40.

At its lower end 44, the McPherson strut 20 is connected with a knuckle assembly 48. The knuckle assembly 48 has rotatively mounted therein a hub/bearing unit 52. The vehicle wheel 56 is connected with the hub/bearing unit 52 by a series of lug nuts 60. A rotor, not shown, is sandwiched between the hub and the wheel. A pneumatic tire 62 is mounted on the vehicle wheel 56 and is rotatively powered by a half-shaft 64 which is rotated by the transaxle (not shown), which is typical of many front wheel drive vehicles.

The knuckle assembly 48 is pivotally connected with a tie rod 68. The tie rod 68 is translated by a steering gear assembly 72. The steering gear assembly 72 is mounted on top of a cross frame assembly 76 which is fixably connected to the frame of the vehicle extending in a lower portion of the engine compartment to provide structural support thereto. The cross frame 76 has a front pivot bracket 78 and a rear pivot bracket 82.

A lower end of the knuckle assembly 48 is mounted for multi-axis pivotal movement upon the ball joint 84. The ball joint 84 is mounted on a lateral arm 86 of a lower control arm assembly 90. The lower control arm 90 has a front arm 92 with a horizontally extending cylindrical end 94. Cylindrical end 94 mounts a lower control arm front bushing 98 that receives a horizontal pin 102. The horizontal pin 102 connects the lower control arm front arm 92 with the front pivot bracket 78 of the cross frame 76. When in an assembled position, cylindrical end 94 is captured within a pocket 106 of the cross frame 76. The lower control arm 90 also is pivotally connected with a sway shaft 110 via a pin 112 to control vehicle roll during a cornering maneuver.

The lower control arm 90 also has a rear arm 116. The rear arm 116 has a generally cylindrical housing 120. The housing 120 has inserted therein a bushing 7 according to the present invention. The bushing 7 accepts a vertical pin 124 which extends through upper and lower holes 128, 132 of the cross frame rear pivot bracket 82.

The bushing 7 has an inner sleeve 136. The inner sleeve 136 is made of a hardened material which is typically a metallic material such as steel. The inner sleeve 136 has an inner bore 138 which receives the vertical pin 124. The inner sleeve 136 also has along its lower end, a perpendicular, generally horizontal extending flange 142. The bushing 7 also has an outer sleeve 146. The outer sleeve 146 has a lower tapered end 148 to assist its insertion into the cylindrical housing 120 of the lower control arm 90 rear arm 116. The outer sleeve 146 also has at its upper end a perpendicular, generally horizontal extending flange 152. The outer sleeve 146 is typically made from a hardened material such as steel and is annularly spaced from the inner sleeve 136. The flange 152 of the outer sleeve has an indention 156 (best shown in FIG. 4) which allows the bushing 7 to be annularly oriented with lower control arm 90 for purposes hereinafter described. An upper end 158 of the inner sleeve 136 is significantly above the upper end or flange 152 of the outer sleeve. The inner sleeve flange 142 is significantly below the lower tapered end 148 of the inner sleeve 136.

Juxtaposed between the inner sleeve 136 and the outer sleeve 146 is a non-fluid filled elastomeric isolator 160. The isolator 160 is fabricated from an elastomeric material, typically rubber. The isolator 160 has a lower skirt 164 that covers the inner sleeve flange 142. The isolator 160 also has an upper skirt 168 that encircles the inner sleeve 136 and protects the same from corrosive elements. The isolator 160 has two transversely aligned solid sections 170. The sections 170 are geometrically separated by the line of reaction 172 which extends between the center of the bushing 7 to a center of the ball joint 84 of the control arm 90 as best shown in FIG. 3.

Figure 3:
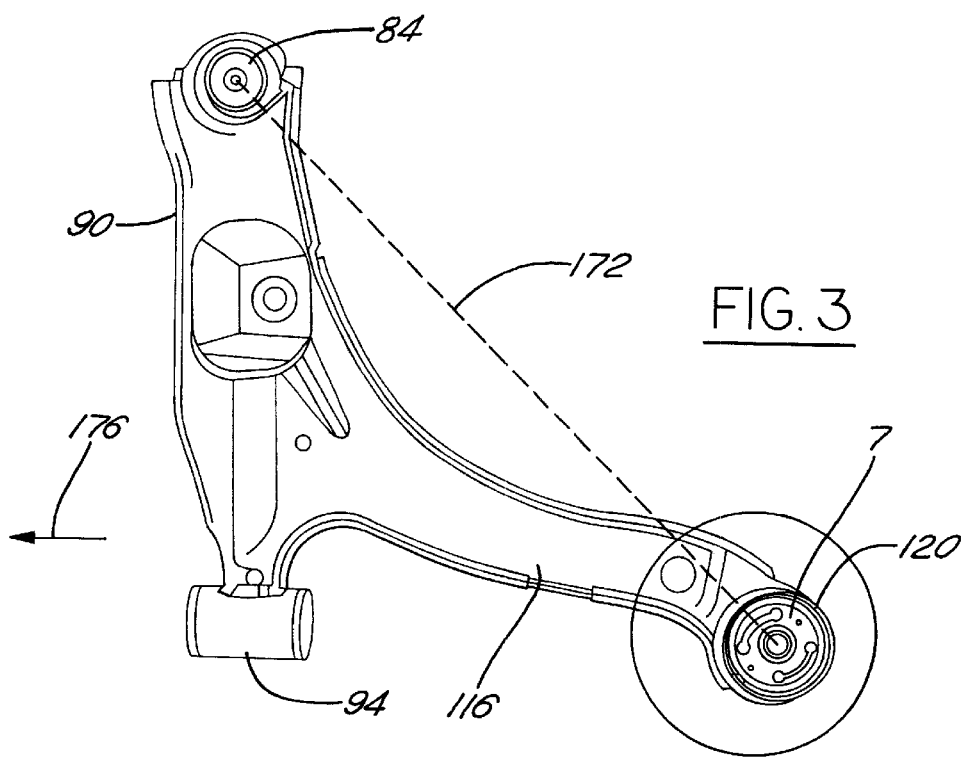
FIG. 3 is a top plan view of a lower control arm shown in FIG. 1.
Figure 4:
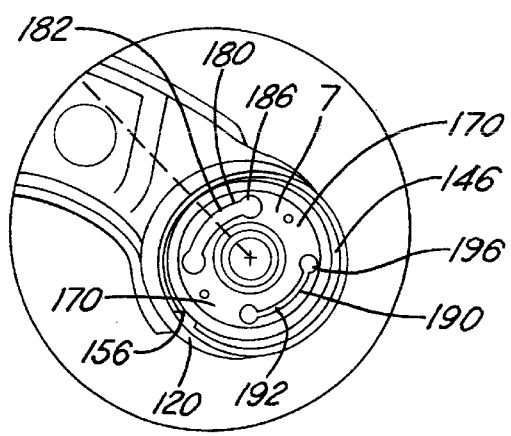
FIG. 4 is an enlargement of the lower control arm shown in FIG. 3 and encircled.
Figure 5:
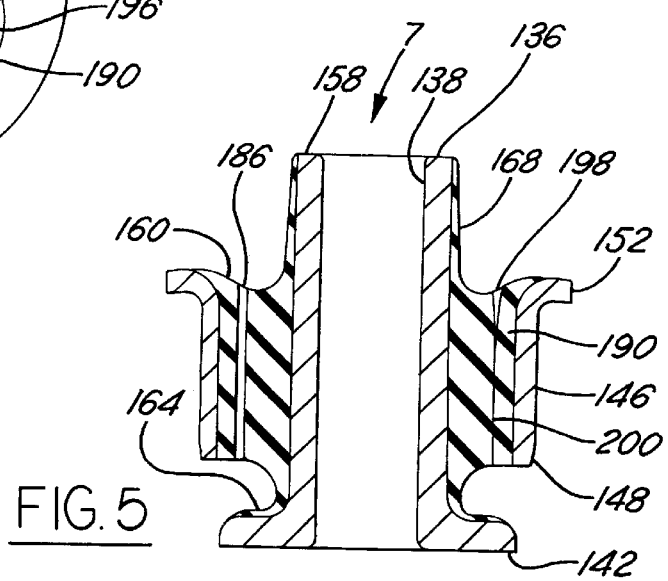
FIG. 5 is a sectional view of a bushing encircled in FIG. 4.

As illustrated in FIGS. 3 and 4, the control arm 90 is for the right front or North American passenger side of the vehicle with the front of the vehicle being oriented in the direction of arrow 176. The bushing 7 has a first arcuate axial slot 180. The first slot 180 in its major arcuate portion 182 has a generally uniform axial thickness, which is greater than 0.9 millimeters and typically will be greater than 1.5 millimeters. At the extreme ends of the major arcuate portion 182 of the slot 180 will be two generally circular bores 186 to relieve stress concentration in the isolator 160.

The isolator 160 also has a second slot 190. The second slot 190 has a major arcuate portion 192, having a non-axially uniform width. The radiuses of the major arcuate portions 182, 192 are generally equal. The axial upper end 198 of the second slot 190 has the greatest thickness which will typically be significantly less than that of the first slot 180 but in all instances will be equal to or greater than one millimeter. The second slot 190 will taper axially down to a lower one-third portion 200 wherein the fore and aft walls of the slot 190 will be in contact with each other. The second slot 190 will be oriented to be in a more rearward position that the first slot 180. Second slot 190 also has circular bores 196 to relieve stress concentrations.

In operation of the vehicle, forces transmitted into the bushing 7 due to steering inputs will act generally perpendicular to the line of force transmission (reaction) 172. Accordingly, such forces will mainly act upon the bushing 7 in the area of the solid sections 170. Therefore, since the sections 170 are solid, the bushing 7 will react as a generally hard spring, giving desired feedback to the steering system. With forward movement of the vehicle and tire 62 hitting an object on the road, the forces acting upon the bushing will tend to act through the first slot 180 of the bushing 7. Due to the width of the slot 180, the bushing 7 will have a much smoother response to this input, therefore providing a greater cushioning effect to the vehicle. In rare instances, bushing 7 will receive an input from a tire hitting an object from the rear (except in the cases where the car is being driven in reverse, which typically will be at a lower speed). Accordingly, due to the size of the second slot 190 the lower third of the second slot 190 will give a very stiff or harsh ride response. However, the presence of the second slot 190 being geometrically positioned with respect to the first slot 180 (both arcuately and radially) leads to better durability of the generally solid sections 170. The second slot 190 also gives the bushing 7 a third spring rate, which significantly reduces the suspension system's sensitivity to rotating mass imbalance. This is accomplished by having a significantly different dynamic spring rate fore vs. aft along the line of force transmission (reaction) 172. Accordingly, the different dynamic spring rates act to cancel the natural resonance of each other. Therefore, a much higher rotating mass imbalance force is required to excite the suspension system. The third spring rate also increases the natural frequency of the bushing 7 as compared to prior bushings wherein the second slot 190 was identical to the first slot 180. Accordingly, the excitation frequency of the bushing 7 is significantly raised. Since the bushing 7 is the softest spring of the suspension system, its frequency of excitation controls the sensitivity of the suspension system to a rotating mass imbalance which is typically a result of an imbalance of the wheel, tire and/or rotor. Accordingly, the bushing 7 of the present invention increases the harshness of the ride primarily when the vehicle is being driven in reverse at low speeds. At the same time, bushing 7 allows an increase of the natural frequency typically in the range of 60% to 100% without a significant increase in ride harshness. This rise in natural frequency significantly decreases the sensitivity of the suspension system to rotating mass imbalance.

The outer sleeve 146 and indention 156 ensures that the second slot 190 is oriented correctly and also prevents the first and second slots 180, 190 from being inordinately compressed upon insertion into the cylindrical housing 120 of the lower control arm 90 rear arm 116.

While the invention has been described in connection with a preferred embodiment, it will be understood that it is not intended to limit the invention to that particular embodiment. On the contrary, it is endeavored to cover all alternatives, modifications and equivalents as may be included within the spirit and scope of the invention as encompassed by the description and as defined by the appended claims.

We claim:

1. A bushing for a suspension system of an automotive vehicle comprising:
   an inner sleeve made of a hardened material;
   an outer sleeve made of a hardened material annularly spaced from said inner sleeve, said outer sleeve having an outwardly extending flange at one end thereof; and
   a non-fluid filled elastomeric isolator, said isolator being juxtaposed between and bonded to said inner and outer sleeves, said isolator having transversely aligned solid sections and said isolator having first and second generally arcuate axial slots geometrically spaced with respect to one another, said first slot having an arcuate portion with a generally axial uniform first thickness and said second slot having an arcuate portion with a non-uniform axial second thickness, said second slot on an axial upper end having a thickness less than said first slot thickness and said second slot thickness being tapered axially downward, wherein at least a portion of the axial length of said second slot along said lower end has contact between the fore and aft walls of said second slot.

2. A bushing as described in claim 1, wherein said isolator is fabricated from rubber.

3. A bushing as described in claim 1, wherein a top edge of said inner sleeve is substantially above said outer sleeve.

4. A bushing as described in claim 1, wherein said outer sleeve has a locator indention to orientate said bushing.

5. A bushing as described in claim 1, wherein said inner and outer sleeves are made from a metallic material.

6. A front wheel drive suspension system for an automotive vehicle, said suspension comprising:
   a McPherson strut with a top end connected to a shock tower of said vehicle, said McPherson strut being encircled by a front suspension spring;
   a knuckle assembly connected to a lower end of said McPherson strut, said knuckle assembly including a rotatively mounted rotor;
   a wheel/tire combination connected with said rotor having rotational movement with respect to said knuckle assembly;
   a tie rod and steering gear assembly, said tie rod being pivotally connected with said knuckle assembly to pivot the same for steering of said vehicle;
   a cross frame assembly providing structural support for said vehicle, said cross frame assembly mounting said tie rod and steering gear assembly, and said cross frame having a front pivot bracket and a rear pivot bracket;
   a lower control arm assembly, said lower control arm assembly having a front arm for connection with said front pivot bracket of said cross frame assembly by a horizontal pin, and said lower control arm assembly having a lateral arm having a ball joint connected thereto for mounting said knuckle assembly and said lower control arm assembly having a rear arm connected to said cross frame assembly rear pivot bracket by a vertical pin; and
   said lower control arm assembly rear arm having a bushing including:
   an inner sleeve made of a hardened material;
   an outer sleeve made of a hardened material annularly spaced from said inner sleeve, said outer sleeve having an outwardly extending flange at one end thereof;
   and a non-fluid filled elastomeric isolator, said isolator being juxtaposed between and bonded to said inner and outer sleeves, said isolator having transversely aligned solid sections and said isolator having first and second generally arcuate axial slots geometrically spaced with respect to one another, said first slot having an arcuate portion with a generally uniform axial first thickness and said second slot having an arcuate portion with a non-uniform axial second thickness, said second slot on an axial upper end having a thickness more than one millimeter and less than said first slot thickness and said second slot thickness being tapered axially downward wherein at least one-third of the axial length of said second slot along said lower end has contact between the fore and aft walls of said second slot.

7. A suspension system as described in claim 6, wherein said isolator of said lower control arm rear arm bushing is fabricated from rubber.

8. A suspension system as described in claim 6, wherein a top edge of said lower control arm rear arm bushing inner sleeve is substantially above said outer sleeve.

9. A suspension system as described in claim 6, wherein said lower control arm rear arm bushing outer sleeve has a locator indention to orientate said bushing.

10. A suspension system as described in claim 6, wherein said lower control arm rear arm bushing inner and outer sleeves are made from a metallic material.

11. A method of reducing sensitivity of rotating mass imbalance of a front wheel drive vehicle front suspension without significant degradation to vehicle ride harshness level, said vehicle front suspension including:
    a lower control arm assembly, said lower control arm assembly having a front arm for connection with a front pivot bracket by a horizontal pin, and said lower control arm assembly having a rear arm connected to a rear pivot bracket by a vertical pin, and said lower control arm assembly rear arm having a bushing including an inner sleeve made of a hardened material; an outer sleeve made of a hardened material annularly spaced from said inner sleeve, said outer sleeve having an outwardly extending flange; and a non-fluid filled elastomeric isolator, said isolator being juxtaposed between and boned to said inner and outer sleeves, said isolator having transversely aligned solid sections and said isolator having first and second generally arcuate axial slots geometrically spaced with respect to one another, said first slot having an arcuate portion with a generally uniform axial first thickness and said second slot having an arcuate portion with a non-uniform axial second thickness, said second slot on an axial upper end having a thickness less than said first slot thickness and said second slot thickness being tapered axially downward wherein at least a portion of the axial length of said second slot along said lower end has contact between the fore and aft walls of said second slot, said method of reducing sensitivity of rotating mass imbalance comprising:

providing a hard spring for steering inputs into said lower control arm rear arm bushing through said solid sections of said bushing; and providing a soft spring for rearward tire inputs into said lower control arm rear arm bushing and providing a hard spring for forward tire inputs to said lower control arm rear arm bushing to reduce the sensitivity of said suspension system rotating mass imbalance.

* * * * *